United States Patent [19]

Janzen et al.

[11] 3,828,607

[45] Aug. 13, 1974

[54] PHASE LOCK DETECTION AND CONTROL FOR PIEZOELECTRIC FLUID ANALYZERS

[75] Inventors: Dennis W. Janzen; Curtis G. Dell, both of Newark, Del.

[73] Assignee: E. I. du Pont de Nemours and Company, Wilmington, Del.

[22] Filed: Jan. 24, 1973

[21] Appl. No.: 326,239

[52] U.S. Cl. .................................. 73/23, 324/56

[51] Int. Cl. .......................................... G01n 31/06

[58] Field of Search .......... 73/23, 24; 324/56, 57 R, 324/80, 81, 82, 83 R; 321/61 R; 323/101

[56] References Cited

UNITED STATES PATENTS

| | | | |
|---|---|---|---|
| 3,260,104 | 7/1966 | King, Jr. | 73/23 |
| 3,266,291 | 8/1966 | King, Jr. | 73/23 |
| 3,323,043 | 5/1967 | Hekiman | 324/57 R |

OTHER PUBLICATIONS

Control Engineering, "6 Ways to Measure Phase Angle," Staffin, Robert, Oct. 1965, pgs. 78–83.

*Primary Examiner*—Richard C. Queisser
*Assistant Examiner*—Stephen A. Kreitman

[57] ABSTRACT

Phase lock detector for an analyzer employing piezoelectric elements in electrical circuits. In general the piezoelectric elements differentially absorb a particular constituent in an analyzed fluid. This weight change of the crystal induces a change in the oscillator circuit containing this piezoelectric element. A phase detector detects the resultant phase change between the electrical circuits containing the piezoelectric elements, and provides a measurement of the amount of the particular substance sorbed and, thus, within the fluid. The phase detector output also feeds back to one or more of the electrical circuits and forces them to oscillate at the same frequency.

5 Claims, 4 Drawing Figures

PATENTED AUG 13 1974 3,828,607

PHASE LOCK DETECTION AND CONTROL FOR PIEZOELECTRIC FLUID ANALYZERS

BACKGROUND OF THE INVENTION

This invention relates to an analyzing apparatus employing piezoelectric elements. These elements within an analyzer because of either their different coatings or their different environments differentially react to the substance undergoing analysis. This differential reaction often involves the dissimilar sorption of a particular constituent in a fluid.

W. H. King, Jr.'s U.S. Pat. No. 3,266,291 of Aug. 16, 1966 sets forth the principles of fluid analysis based on piezoelectric elements. FIG. 1, taken from this patent, illustrates the operation of such an analyzer.

The two piezoelectric crystals 12 and 16 constitute a part of the measuring and reference oscillator circuits, 10 and 14, respectively. Each of these circuits, including the piezoelectric crystals, has a natural oscillation frequency, on the order of several magahertz.

The piezoelectric crystal displays the behavior that a change in its weight results in a change its effective inductance. This inductance change alters the oscillation frequency of the crystals and the oscillator circuit incorporating it. To take advantage of this behavior, the measuring piezoelectric crystal 12 generally has a coating 24 that interacts with and sorbs the particular constituent in the fluid. Thus, the reference crystal 16 has either a coating 26 different from the coating 24 on the measuring crystal 12 or no coating at all. Consequently, it interacts with and sorbs the desired constituent differently, generally less, than the measuring crystal 12.

In this mode of operation, the sample passes through sample cell 22 and over both piezoelectric crystals 12 and 16. The crystal 12, with its coating 24, sorbs more of the particular constituent, for example water, than the crystal 16 with its coating 26 or uncoated. The consequently greater weight change of crystal 12 produces a greater frequency change in the measuring oscillator circuit 10 than the reference oscillator circuit 14. This frequency change, upon detection, provides a measure of the amount of the particular constituent in the sample.

Another common method of making measurements utilizes two piezoelectric crystals having the same coating. However, the sample fluid passes over the measuring crystal while a reference fluid passes over the other crystal. The difference in the amount of the particular constituent in the fluids induces the desired frequency change. A further facet of this type of measurement has the sample and reference fluids switching with each other and alternately passing over both of the crystals. This permits compensation for instrumental zero drift without the necessity of making adjustments.

Piezoelectric analyzers also serve to monitor the vapor deposition of metals and other substances. A portion of the vapor deposits on a piezoelectric crystal which then gives a measurement of the amount of the substance on other objects.

The composition and shape of most piezoelectric crystals renders them relatively insensitive to temperature changes. However, the choosing of crystals displaying a large temperature dependence allows piezoelectric temperature measurements.

In order to measure the frequency difference thus induced in the oscillator circuit, King incorporates a variable capacitor 18 within either the measuring circuit 10 or the reference circuit 14, preferably the latter. Changing the capacitance of the capacitor 18 will either equalize the frequency of the two oscillators circuits 10 and 14, or cause them to differ by the predetermined amount established by the audio oscillator 28. Upon accomplishing either of these tasks as appropriate and as determined by the headset 20 or other detector sensitive to the audio range, the calibrated dial on the variable capacitor 18 indicates the amount of the constituent within the sample.

While this method of fluid analysis has provided a remarkable tool for the analysis of constituents within fluids, nonetheless, it contains inherent limitations. A single cycle represents the smallest frequency difference that a headset or other frequency-measuring device can detect. Thus, measurements taken over any set period of time can only detect concentrations of a particular constituent which produces a complete whole cycle difference in the signals of the two circuits over that set time period. For example, over the period of one second, the instrument cannot detect any concentration of a constituent below that which will produce a frequency difference of one cycle per second. Additionally, this limitation tends to permit noise within the circuit to camouflage the signal.

SUMMARY OF THE INVENTION

Phase detecting any phase difference between the individual signals within the two electrical circuits with the piezoelectric elements and applying to at least one of these circuits electrical signals that will cause the phase difference between the signals to approach a predetermined value, generally 0° or 90°, overcomes the limitations inherent in the above method of merely substracting the frequency of one circuit from that of the other. It also permits analyses of systems where the concentrations of a particular constituent undergoes rapid changes.

The phase detector can detect a phase difference of less than an entire cycle and accordingly does not require a complete 360° cycle difference. Furthermore, the detector can make a separate measurement for each individual cycle of an electrical circuit which represents several million measurements per second. By comparison, King's method allows only one measurement for each complete cycle of the signal resulting from the substraction of the signal in one oscillator from the other. As this difference depends upon the amount of the constituent differentially sorbed, the number of measurements may wane to only a few per second or even less. Thus, the phase-detecting method allows vastly more measurements in any period of time and displays greater sensitivity to smaller circuit changes resulting from low concentrations of the particular constituent in the sample. Consequently, these improvements also tend to increase the signal-to-noise ratio.

However, merely detecting the phase difference between the two signals does not suffice to provide a constant signal indicative of the differential response of the piezoelectric crystals. The different frequencies will produce a "beat" pattern by passing into and out of phase with each other. As a result, the phase difference will go through complete cycles of 0° to 360°. However, forcing the frequencies in the circuits to equal each other will avoid this. This frequency equalization eliminates the "beat" signal with the concommitment varying phase difference. Upon the forced frequency equalization, the signal in one circuit may lead or lag the signal in the other by a small amount. This lead or lag, detected by the phase detector, will provide both the measure of the amount of constituent preferentially sorbed, and also the electrical signal forcing the frequencies in the circuits to equal each other.

This signal eminating from the phase detector may directly bring the circuit frequencies together. More generally, though, the signal undergoes some modification which very often includes amplification.

The frequency-determining network includes all components in the electrical circuit that affect the oscillation frequency of the circuit. To utilize the signal generated by the phase detector, at least one of the networks generally includes a component which will change the frequency of its circuit. The voltage variable capacitor represents one such element. Changing the d.c. voltage applied to the frequency-determining network changes the capacitance of this capacitor and thus the circuit's oscillation frequency.

Thus, analyzers which employ piezoelectric elements show improved performance and capabilities when they include some means for detecting any phase difference in the electrical circuits of which the piezoelectric elements form parts, and, responsive to this phase-detecting means, other means coupled between the phase-detecting means and at least one of the electrical circuits, which will apply a signal that will cause the phase difference in the circuits' signal to approach a predetermined value. Generally, the signal applied to the electrical circuit should substantially eliminate any frequency difference in the signals in the circuits.

DESCRIPTION OF THE INVENTION

Figure 1:
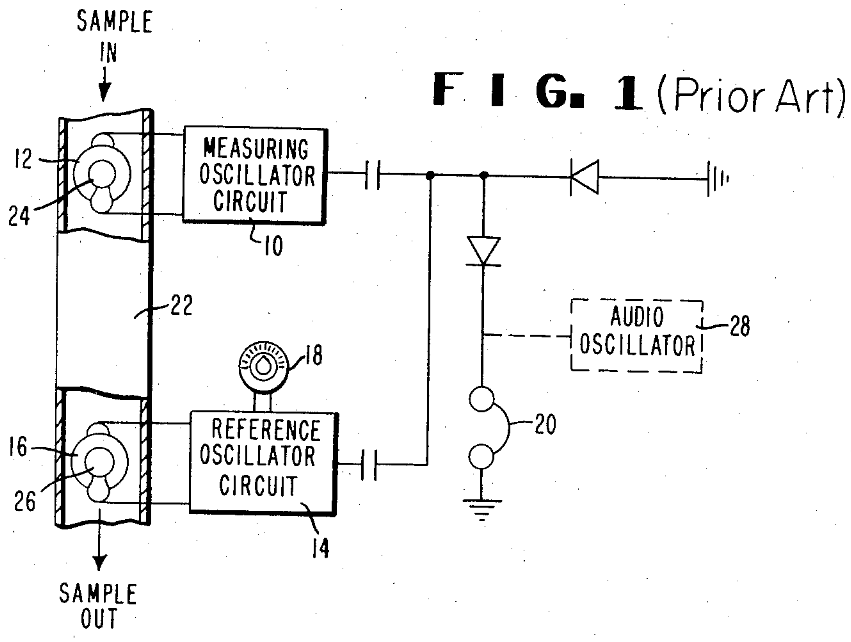
FIG. 1 (Prior Art)
FIG. 1 portrays a schematic diagram of a priorart fluid analyzer employing piezoelectric elements.
Figure 2A:
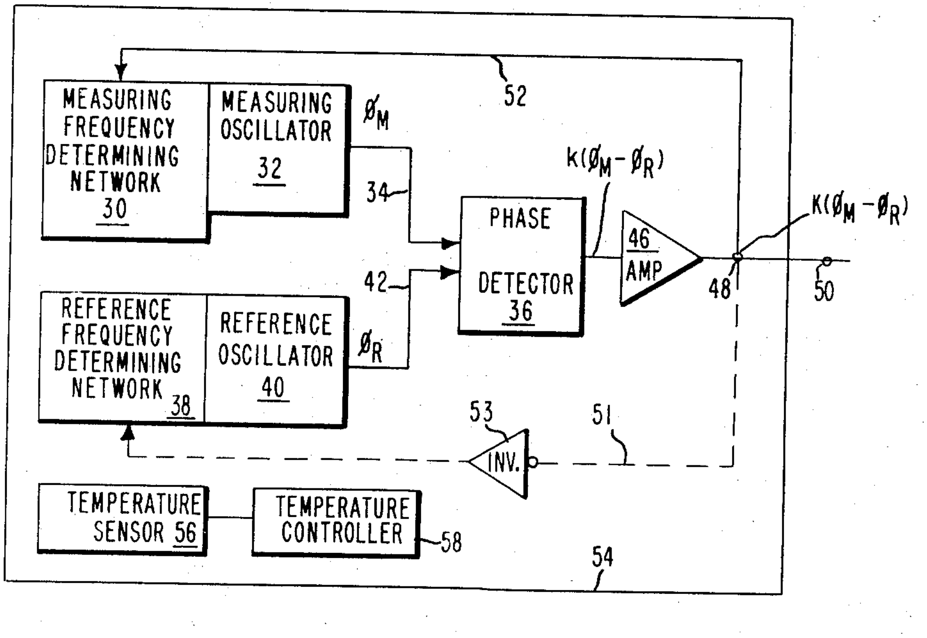
FIG. 2A gives a schematic diagram of a fluid analyzer with piezoelectric elements employing phase lock control and detection.
Figure 2B:
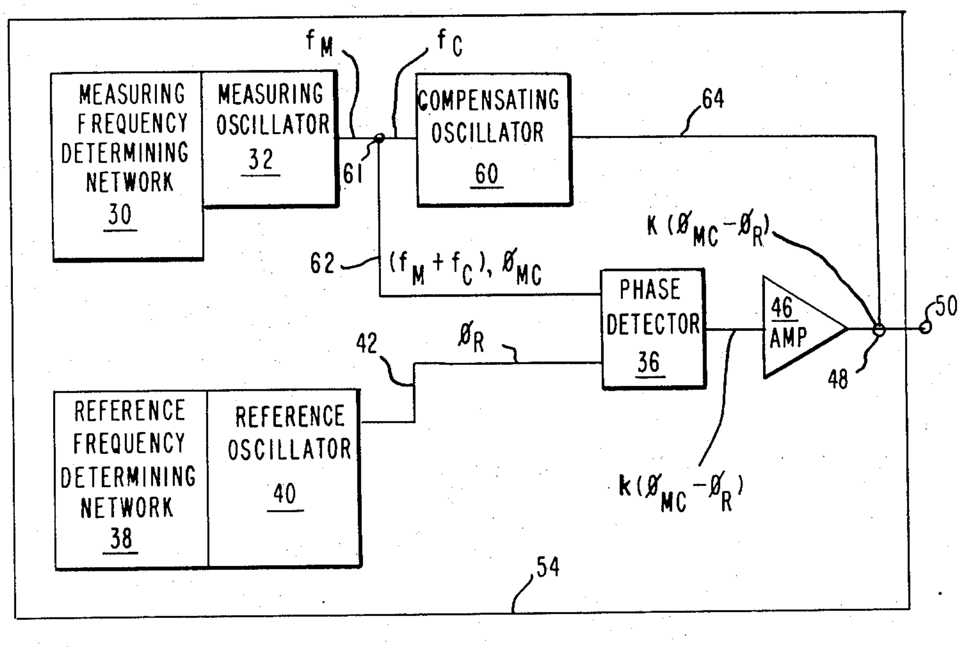
FIG. 2B diagrams an alternate phase lock analyzer.

The phase detector 36 represents a basic feature of the improved analyzers schematically illustrated in FIGS. 2A and 2B. In the analyzer of FIG. 2A, it receives one signal along connector 34 from the measuring circuit which includes the measuring frequency-determining network 30 and the measuring oscillator 32. It also receives another signal via connector 42 from the reference circuit which includes both the reference frequency-determining network 38 and the reference oscillator 40.

Phase detector 36 compares the phase $\phi_M$ received from connector 34 from the measuring circuit with the phase $\phi_R$ received from connector 42 from the reference circuit 40. The phase detector 36 provides along circuit 44 a signal $k(\phi_M - \phi_R)$ proportional to the phase difference between $\phi_M$ and $\phi_R$. Amplifier 46 provides d.c. amplification of the signal and gives $K(\phi_M - \phi_R)$ at 48 which also varies proportionally with the phase difference between the signals from the measuring and reference circuits. This signal provides an output at point 50 and also serves to control either or both of the frequency-determining networks.

However, the phase detector need not produce a signal proportional to $(\phi_M - \phi_R)$. Any signal indicative of the actual phase difference between the electrical circuits will suffice. Thus, the phase detector discussed below with regards to FIG. 3 produces a signal that pulses between two specified d.c. potentials; the duration of the pulses at the respective levels indicates the actual phase difference between the signals in the circuits. Thus, the phase detector of FIG. 3 produces a signal indicative of, but not proportional to, the magnitude of the detected phase difference.

While amplifier 46 represents a usual element in the phase lock circuit of FIGS. 2A and 2B, it is not essential. In its absence, the phase detector 36 should provide a sufficient signal along conductor 52 to effect the control and preferably reduction of the phase difference between the electrical circuits.

In FIG. 2A, the signal at point 48 passes through the conductor 52 to change the signal in the measuring electrical circuit to control the actual phase difference between the signals in the measuring and reference circuits. Alternatively, the signal at 48 may be passed along conductor 51 through the inverter 53 to the reference frequency-determining network 38. After passing through the inverter 53, it would effect a change in the reference frequency-determining network 38 opposite to its effect on the measuring frequency-determining network 30 if passed through conductor 52. In either case, the signal causes the phase difference between the two circuits to approach the predetermined value, generally 0° or 90°, and preferably the former.

Passing the signal from the point 48 along both conductors 51 and 52 represent another alternative. Because of the inverter 53, the signals would have a push-pull effect on the frequency-determining networks 30 and 38. This push-pull arrangement effectively doubles the concentration range over which the phase detector 36 can react to control the phase difference and substantially eliminate the frequency difference between the circuits.

The frequency-determining network receiving a signal from the phase detector 36 should contain an element that will respond to this signal. Preferably this element responds electrically to the signal, which represents a preferred embodiment and receives further discussion below with regards to FIG. 3.

Alternatively, this element in the frequency-determining network may respond mechanically. The signal along conductor 52, for example, may produce a mechanical adjustment of an electrical component, such as a variable capacitor, in the frequency-determining network. Any method suffices so long as it affects the phase and frequency of the electrical circuit.

FIG. 2A also shows the container 54 enclosing the phase lock circuit. A temperature sensor 56 and a temperature controller 58 responding to the sensor 56 also sit within this enclosure. Although not necessary, these two temperature elements maintain the oscillator circuits and the phase-locking components at a constant temperature. Since the performance of many components, especially the solid-state items, depend upon temperature, a constant temperature eliminates variations from these components due to fluctuating temperatures. This becomes particularly important in the oscillator circuits where altered performance can produce oscillator instability. In particular, maintaining the temperature of at least the transistors controlling the oscillator voltage supply constant helps assure oscillator stability.

FIG. 2B differs from FIG. 2A by including the compensating oscillator 60 as a separate oscillating circuit within the mesuring electrical circuit. The outputs of the compensating oscillator 60, with frequency $f_c$, and the measuring oscillator 32, with frequency $f_M$, mix together at the point 61 to provide a mixed output of frequency ($f_M \pm f_c$) and phase $\phi_{MC}$ along conduit 62. This mixed output then passes to the phase detector 36 where it combines with the signal, having the phase $\phi_R$, from the reference circuit as in FIG. 2A. The phase detector 36 produces an output with a magnitude $k(\phi_{MC} - \phi_R)$ which the amplifier 46 increases to $K(\phi_{MC} - \phi_R)$. This amplified output, appearing at the juncture 48, provides the output for the analyzer at the point 50, and also passes along conductor 64 to the compensating oscillator 60. There it alters the frequency of the compensating oscillator 60 in order that phase ($\phi_{MC}$ ) of the mixed output of the measuring circuit will generally tend to differ from the phase $\phi_R$ of the reference circuit by the predetermined amount. Alternately, the compensating oscillator 60 may form part of the reference electrical circuit rather than the measuring circuit.

Piezoelectric analyzers have found frequent use in the analyses of moisture. In this case, either the coatings on the crystals will display different sorptivity to water, or the sample fluid will pass over one crystal, while a reference gas passes over the other. In the latter instance, switching this sample and reference gases and averaging the results will cancel out errors due to unequal reference and measuring crystals or circuits.

Further, a judicious selection of the crystal coating will permit the analysis for other particular constituents in fluids. Moreover, with a circuit having a sufficiently fast response time, the piezoelectric analyzer may find use as a particle-weight analyzer. To achieve this, the particles should pass over and onto the measuring crystal, but not the other. Switching the roles of the crystal will again tend to cancel some instrumental errors.

Figure 3:
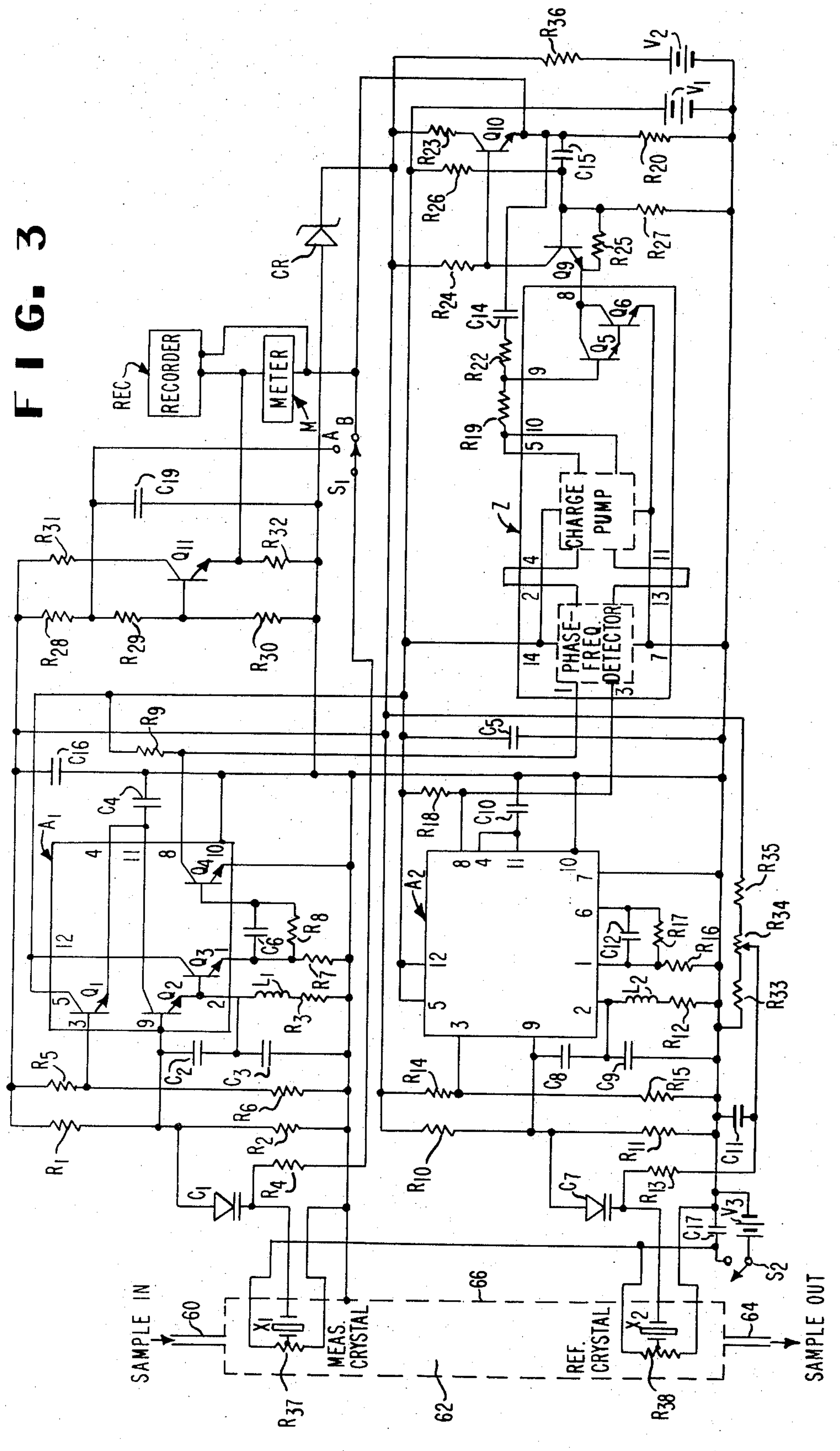
FIG. 3 portrays a detailed circuit diagram of a preferred analyzer employing phase lock detection and control.

FIG. 3 diagrams a specific circuit that permits phase lock detection and control of piezoelectric analyzers. This circuit also permits operation in the usual frequency difference detection method as discussed below.

Potential sources $V_1$ and $V_2$ supply the power for the circuit. As $V_2$ supplies the greater potential difference, a separate $V_1$ is not required. Rather, a potential divider may provide the $V_1$ from $V_2$.

The Zener diode CR regulates the voltage provided by the potential source $V_2$ through resistor $R_{36}$. In this particular circuit, while the potential supply $V_2$ provides 39 volts, the Zener diode effectively regulates at 30 volts.

The sample fluid for this apparatus enters through port 60 and passes over the measuring piezoelectric crystal $X_1$ in sample chamber 62, bounded by the container wall 66. The sample fluid subsequently passes over the reference crystal $X_2$ and out port 64.

The reference frequency-determining network includes, in addition to the crystal $X_1$, capacitors $C_1$, $C_2$ and $C_3$. The transistor component $Q_2$ of the transistor array $A_1$ provides the amplification for this oscillator circuit.

The performance characteristics of all these components tend to fluctuate with changing temperature. Thus, controlling the temperature of the circuit containing these elements improves the stability of oscillation. The transistor component $Q_1$ of the transistor array $A_1$ represents the voltage regulator for the oscillator and also has a performance dependent upon temperature. Thus, including it within the controlled-temperature environment also helps to stabilize the oscillator.

The component $Q_3$ of the transistor array $A_1$ provides a follower amplifier to buffer the measuring oscillator circuit from the remainder of the overall electronic circuit and especially from the reference circuit. This allows the oscillation of these two circuits to proceed independently of each other.

Finally, the component $Q_4$ simply provides power amplification of the output of the measuring circuit. The output from its emitter then passes to the phase-frequency detector component of the integrated-circuit element Z through its terminal 1.

Remarks similar to those above for the measuring oscillator circuit apply equally well to the reference circuit. Capacitors $C_7$, $C_8$, and $C_9$ determine the latter's oscillation frequency. Transistor array $A_2$ has the same components performing the same functions as transistors array $A_1$; consequently the drawing does not show its innards. The output of the reference oscillator circuit passes from terminal 8 of the transistor array $A_2$ to the phase-frequency detector through terminal 3 of the integrated circuit Z.

The phase-frequency detector component provides a digital output characteristic of the phase and frequency differences between the measuring and reference circuits. In operation, it samples the negative-going transistions of the current in the measuring circuit. If the two circuits have equal frequency and phase, the outputs of the phase-frequency detector component of the element, at terminals 2 and 13, are "high." If the phase in the measuring circuit leads or lags the reference phase, then output 2 or 13 of the element Z goes "low," respectively. This phase-frequency detector component of the element Z actually represents a "zero-phase" detector; both outputs lock high when the detector detects a zero phase difference between the circuits. Also employable is a quadrature-phase detector which similarly locks high when the measuring phase lags the reference phase by 90°.

The charge-pump component of the integrated element Z then converts the digital output from the phase-frequency detector to fixed-amplitude positive and negative pulses, depending upon whether the detector output goes high or low. These pulses appear at the terminals 5 and 10, respectively. The resistors $R_{19}$ and $R_{22}$, along with capacitor $C_{14}$, serve to integrate the pulsed signal from the charge pump. The resistor $R_{22}$, especially, controls the band-pass characteristics of the entire amplifier for stability and the prevention of oscillation. The transistor components $Q_5$ and $Q_6$ of the integrated element Z, as well as transistors $Q_9$ and $Q_{10}$, then amplify this d.c. signal to give another d.c. signal also proportional to the phase difference in the circuits.

This d.c. signal, appearing at the emitter of the transistor $Q_{10}$, may then be used in either of two ways, depending upon the position of the switch $S_1$. With the switch $S_1$ making contact to terminal B, as indicated in the figure, this circuit operates in the phase lock mode. Then, the d.c. signal from the emitter of transistor $Q_{10}$, proportional to the phase difference between the circuits, passes through the resistor $R_4$ and applies a potential to the capacitor $C_1$. The actual capacitance of the voltage variable capacitor $C_1$ depends upon the d.c. voltage applied to it. Accordingly, the voltage developed at the emitter of the transistor $Q_{10}$, by changing its capacitance, forces the frequency in the measuring frequency-determining network to equal that in the reference network.

Furthermore, the output signal also passes to an indicating device, such as the meter M, a recorder REC, or both, as shown in the figure. However, this circuit would give a positive voltage at the output when the sample contains none of the particular constituents analyzed for. As a result, the second terminal of the recorder REC and the meter M connect to the output of transistor $Q_{11}$ which provides a voltage that bucks out this zero-point voltage.

Switching the switch $S_1$ to terminal A opens the phase lock loop in FIG. 3. In this mode, the voltage variable capacitor $C_1$ obtains a constant potential from the potential divider represented by resistors $R_{28}$, $R_{29}$, and $R_{30}$. As a result, any weight change in the measuring crystal $X_1$ induces an actual frequency change in the measuring and reference oscillator circuits which then travels to the phase-detector component of the element Z.

The signals in the two circuits, because of their frequency difference, produce a "beat" signal with a frequency equal to this difference. The phase detector detects this beat frequency, which, after passing through the charge pump, integrator, and amplifier provides an a.c. signal having a frequency equal to the frequency difference between the signals in the two circuits. This a.c. signal passes to the meter M and recorder REC which should have frequency-measuring adaptations. As previous piezoelectric analyses stated their results in terms of frequency differences, this mode of operation permits the comparison of results obtained from this circuit with those obtained previously.

The variable resistor $R_{34}$ permits adjustment of the potential appearing on the voltage variable capacitor in the reference frequency-determining network. This adjustment allows a change in the frequency of the reference circuit in order to equalize the frequencies in both circuits when none of the constituent appears at either crystal. This "zeros" the circuit so that the meter M and the recorder REC will indicate the absence of any constituent when such represents the actual state of conditions.

Any sorption of the particular constituent by the crystals $X_1$ or $X_2$, particularly the former, occurs rapidly. The desorption, however, generally takes longer. Accordingly, closing the switch $S_2$ permits the passage of potential from $V_3$ through the resistors $R_{37}$ and $R_{38}$ in close proximity to the crystals. This produces a brief heating of the crystals and speeds the evaporation of the constituent. The switch $S_2$ may have either manual or automated actuation. W. H. King, Jr.'s U.S. Pat. No. 3,478,573 of Nov. 18, 1969 describes the incorporation of the heating elements $R_{37}$ and $R_{38}$ onto the crystals $X_1$ and $X_2$.

The Table sets forth typical values for the elements of the circuit in FIG. 3. The crystals $X_1$ and $X_2$ are megahertz quartz crystals which operate in the antiresonant mode.

TABLE

| ELEMENT | VALUE |
|---|---|
| $A_1$, $A_2$ | CA 3018 |
| Z | MC4044L |
| $Q_9$, $Q_{10}$, $Q_{11}$ | 2N5826 |
| CR | IN5256B |
| $X_1$, $X_2$ | Quartz Crystals |
| $L_1$, $L_2$ | 100 μH |
| $C_1$, $C_7$ | MV 2109 |
| $C_2$, $C_8$, $C_{15}$ | 150 pf |
| $C_3$, $C_9$ | 47 pf |
| $C_4$, $C_{10}$, $C_{11}$, $C_{17}$ | 0.0047μf |
| $C_5$, $C_{14}$ | 0.047 μf |
| $C_6$, $C_{12}$ | 0.0022 μf |
| $C_{16}$, $C_{19}$ | 0.01 μf |
| $R_1$, $R_{10}$ | 232 KΩ, 1% |
| $R_2$, $R_{11}$, $R_{29}$, $R_{30}$ | 20 KΩ, 1% |
| $R_3$, $R_{12}$ | 470 Ω |
| $R_4$, $R_{13}$ | 1 megΩ |
| $R_5$, $R_{14}$ | 73.2 KΩ, 1% |
| $R_6$, $R_{15}$ | 10 KΩ, 1% |
| $R_7$, $R_{16}$ | 390 Ω |
| $R_8$, $R_{17}$, $R_{19}$ | 2 KΩ |
| $R_9$, $R_{18}$ | 620 Ω |
| $R_{20}$, $R_{24}$, $R_{32}$ | 15 KΩ |
| $R_{22}$ | 4.7 KΩ |
| $R_{23}$, $R_{31}$ | 220Ω |
| $R_{25}$ | 10 KΩ |
| $R_{26}$ | 1 KΩ |
| $R_{27}$ | 1.5 KΩ |
| $R_{28}$ | 80.6 KΩ, 1% |
| $R_{33}$ | 6.65 KΩ, 1% |
| $R_{34}$ | 20 KΩ |
| $R_{35}$ | 73.2 Ω, 1% |
| $R_{36}$ | 820Ω |
| $R_{37}$, $R_{38}$ | 20 Ω |
| $V_1$ | 5 V. |
| $V_2$ | 39 V. |
| $V_3$ | 3 V. |

What is claimed is:

1. In an analyzer of the type employing: first and second detection devices, including piezoelectric elements which interact differently with a sample fluid; frequency determining networks for controlling the oscillations of said first and second detection devices; and comparison means to determine the difference between the oscillation of the first and second detection devices so that the effect on the detection devices, and therefore the amount, of at least one component of the sample fluid can be determined, the improvement wherein:

a. said comparison means comprises a phase-frequency detecting means to detect any difference between the frequency and phase of oscillation of said first and second detection devices and to generate a signal characteristic of that difference;

b. at least one of said frequency determining networks comprises:

1. frequency responding means operatively coupled to said phase-frequency detecting means to change the oscillating frequency of the detection device associated with that frequency detecting network until the oscillating frequencies of said first and second detection devices are substantially equal; and 2. phase responding means operatively coupled to said phase-frequency detecting means to change the oscillating phase of the detection device associated with that frequency determining network until the phase difference between the oscillators of said first and second detection devices approach a predetermined value; and c. said comparison means further comprises means to determine the signal required to keep the oscillations in the first and second device within the predetermined value of one another.

2. The analyzer of claim 1 wherein said frequency responding means and said phase responding means comprise a single phase-frequency responding circuit capable of changing the oscillation of one of said detection devices until its frequency and phase match that of the other detection device.

3. The analyzer of claim 2 wherein the signal generated by said phase-frequency detecting means is a d.c. voltage and said phase-frequency responding circuit include a voltage variable capacitor.

4. The analyzer of claim 1 wherein one of said detection means further comprises, as a feedback circuit, a separate oscillating circuit, the output of which is mixed with the output of one of said frequency determining networks to form a mixed output which is applied to said phase-frequency detecting means, and wherein the signal generated by said phase-frequency responding circuit is applied to said separate oscillating circuit.

5. The analyzer of claim 1 wherein said phase-frequency detecting means comprises: a phase frequency detector, which produces a substantially digital output; a charge pump, coupled to said phase-frequency detector, for converting said substantially digital output into pulses of specified d.c. potentials; integrating means, coupled to said charge pump, for integrating said pulses of d.c. potential into a d.c. signal; and a d.c. amplifier, coupled to said integrating means, for amplifying said d.c. signal.

* * * * *